(No Model.)
B. NOTTING.
BUNG EXTRACTOR.
No. 285,655. Patented Sept. 25, 1883.
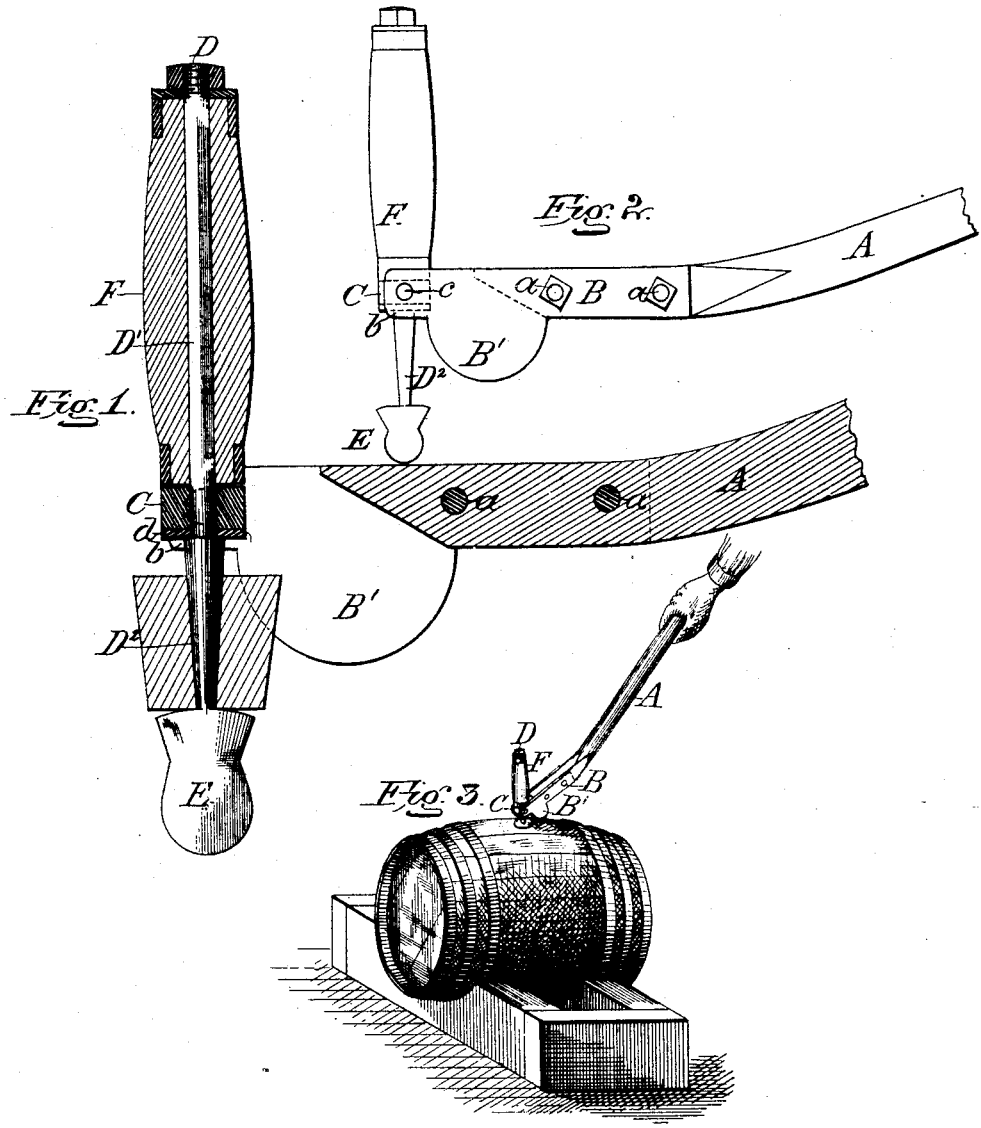

UNITED STATES PATENT OFFICE.

BERNARD NOTTING, OF PORT WASHINGTON, WISCONSIN.

BUNG-EXTRACTOR.

SPECIFICATION forming part of Letters Patent No. 285,655, dated September 25, 1883.

Application filed July 28, 1883. (No model.)

*To all whom it may concern:*

Be it known that I, BERNARD NOTTING, of Port Washington, in the county of Ozaukee, and in the State of Wisconsin, have invented certain new and useful Improvements in Bung-Extractors; and I do hereby declare that the following is a full, clear, and exact description thereof.

My invention relates to devices for extracting the ordinary solid bungs, driven evenly with the outer surface of casks, kegs, and barrels; and it consists in certain peculiarities of construction, as will be more fully set forth hereinafter, and particularly pointed out in the claims.

In the drawings, Figure 1 is a sectional view of my device, showing the manner in which it is driven through a bung. Fig. 2 is a side elevation of the implement, not showing the bung; and Fig. 3 is a perspective view, showing the device in operation.

A is the lever-handle of my device, provided at its end with the plates or castings B, preferably bolted together, and thereby forming a forked end, having semicircular bearing-surfaces B', and end lugs or extensions, b, perforated to receive the trunnions c of a ring or collar, C, while the said handle is inserted between the rearward-projecting ends of the castings B, and secured thereto by bolts or rivets a a, as shown.

Instead of the two plates B described, I may substitute a single forked casting, which would accomplish the same result.

D represents a rod, screw-threaded at top, and having a squared shank, D', extending down as far as the top of the collar C, where it is wound, and beneath the collar having an enlargement or shoulder to receive a washer, d, as well as the said collar, and thence formed taperingly, as at D², terminating with a spear, E, preferably of rounded outline, and made very thin at the cutting-edge, so as to readily penetrate the bung and pass through it, as best shown in Fig. 1. The squared shank is inclosed by a handle, F, having a corresponding vertical central square bore, and provided with a washer and nut at top to properly secure this handle (which is preferably of wood, like the handle A) to the squared shank D'.

The operation of my device is very simple. I place it upon a cask or barrel with the cutting-edge of the spear-head E resting on the bung, and strike a blow with a mallet or hammer upon the top of the rod D, which forces the spear through the bung, holding the lever-handle A all the time with the other hand, as shown in Fig. 3, and then simply dropping the mallet or hammer, and without moving the body at all I take hold of the handle F and turn the spear-head E at right angles to its former position, which is instantly effected by reason of the squared shank D' and square bore of the said handle, the handle being entirely free from the collar C, as shown in Fig. 1, and then a simple downward pressure on the lever-handle A will serve to instantly draw the bung from the cask or barrel, the rounded portions B' of the casting or plates B acting as a fulcrum.

I am aware that a similar device to mine in some respects was patented to William Heinle on the 28th of March, 1876; but his device required that the operator should stand at one side of the barrel with the implement at right angles or across it, and after the spear had been driven through the bung he was obliged to turn the entire device around lengthwise of the barrel, and then to extract the bung a blow on the end of his lever was necessary, besides which his fulcrum was a movable one, requiring adjustment, all this requiring greater expenditure of time and trouble than does mine, unless he employed two men in the operation, whereas mine is a simple device, requiring only one operator and no change in the position of the fulcrum or lever-handle at any time, while the trunnions on the ring or collar of my device adapt it for use with casks, kegs, or barrels of different sizes.

Having thus described my invention, what I claim as new, and desire to secure by Letters Patent, is—

1. In a bung-extractor, the combination of a lever-handle rigidly secured to a fulcrum, and having perforations beyond said fulcrum, receiving the trunnions of a ring or collar through which is passed the rod of a spear-head, the shank of said rod being inclosed within a suitable handle, substantially as set forth.

2. The combination of the lever-handle A, casting or plate B, with fulcrum B', and perforated lugs b, collar C, with trunnions c, stationary spear-head E, with shank D solid therewith, and having a round portion within the collar C, and handle F, substantially as set forth.

In testimony that I claim the foregoing I have hereunto set my hand, on this 25th day of May, 1883, in the presence of two witnesses.

BERNARD NOTTING.

Witnesses:
H. G. UNDERWOOD,
M. KAUMHEIMER.